United States Patent
Yao et al.

(10) Patent No.: US 10,135,543 B2
(45) Date of Patent: Nov. 20, 2018

(54) CLOCK RECOVERY METHOD, DEVICE AND SYSTEM AND COMPUTER STORAGE MEDIUM

(71) Applicant: ZHONGXING MICROELECTRONICS TECHNOLOGY CO. LTD, Guangdong (CN)

(72) Inventors: Yangzhong Yao, Guangdong (CN); Yi Cai, Guangdong (CN); Yunpeng Li, Guangdong (CN); Guohua Gu, Guangdong (CN); Wei Ren, Guangdong (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 129 days.

(21) Appl. No.: 15/104,425

(22) PCT Filed: Apr. 1, 2014

(86) PCT No.: PCT/CN2014/074566
§ 371 (c)(1),
(2) Date: Jun. 14, 2016

(87) PCT Pub. No.: WO2015/103816
PCT Pub. Date: Jul. 16, 2015

(65) Prior Publication Data
US 2016/0329970 A1    Nov. 10, 2016

(30) Foreign Application Priority Data

Jan. 10, 2014  (CN) .......................... 2014 1 0012704

(51) Int. Cl.
*H04B 10/00* (2013.01)
*H04B 10/61* (2013.01)
(Continued)

(52) U.S. Cl.
CPC ........... *H04B 10/6162* (2013.01); *H04B 3/06* (2013.01); *H04B 10/6165* (2013.01);
(Continued)

(58) Field of Classification Search
CPC .. H04B 10/6162; H04B 10/6165; H04B 3/06; H04L 25/03; H04L 7/0058; H04L 7/0075; H04L 7/02
(Continued)

(56) References Cited

U.S. PATENT DOCUMENTS 6,421,378 B1 * 7/2002 Fukuoka ................ H04B 7/005
                                                            375/229
7,158,567 B2 * 1/2007 Wang ................. H04B 10/6971
                                                            375/232
(Continued)

FOREIGN PATENT DOCUMENTS

CN    1280434 A    1/2001
CN    1131604 C    12/2003
(Continued)

OTHER PUBLICATIONS

Korean Notice of Allowance dated Nov. 14, 2017 received in Korean Patent Application No. 10-2016-7013711, together with an English-language translation.
(Continued)

*Primary Examiner* — Amritbir Sandhu
(74) *Attorney, Agent, or Firm* — Scully, Scott, Murphy & Presser, P.C.

(57) ABSTRACT

A clock recovery method is provided. The method has the following operations: performing clock balance pre-filtering on an input time/frequency domain signal according to a self-adaptive balance coefficient input currently, to obtain a balance pre-filtering signal; according to the balance pre-filtering signal, acquiring a phase error of the input time/
(Continued)

frequency domain signal; and performing phase adjustment on the input time/frequency domain signal according to the phase error, and outputting a new self-adaptive balance coefficient after self-adaptive balance processing is performed on the phase-adjusted time/frequency domain signal. A clock recovery device and system and a non-transitory computer-readable storage medium are also provided.

20 Claims, 4 Drawing Sheets

(51) Int. Cl.
*H04L 7/02* (2006.01)
*H04L 25/03* (2006.01)
*H04B 3/06* (2006.01)
*H04L 7/00* (2006.01)

(52) U.S. Cl.
CPC .......... *H04L 7/0058* (2013.01); *H04L 7/0075* (2013.01); *H04L 7/02* (2013.01); *H04L 25/03* (2013.01)

(58) Field of Classification Search
USPC .............................. 375/229–236; 398/208–211
See application file for complete search history.

(56) References Cited

U.S. PATENT DOCUMENTS

| | | | | |
|---|---|---|---|---|
| 7,190,744 | B2* | 3/2007 | Xia | H04L 25/03057 |
| | | | | 375/262 |
| 7,301,997 | B1* | 11/2007 | Wang | H04B 10/6971 |
| | | | | 333/18 |
| 8,149,907 | B2* | 4/2012 | Chou | H03K 9/08 |
| | | | | 375/232 |
| 9,337,993 | B1* | 5/2016 | Lugthart | H04L 7/033 |
| 2012/0155881 | A1* | 6/2012 | Zhao | H04B 10/25133 |
| | | | | 398/81 |
| 2012/0213510 | A1* | 8/2012 | Stojanovic | H04B 10/613 |
| | | | | 398/25 |
| 2012/0219302 | A1* | 8/2012 | Sun | H04B 10/6161 |
| | | | | 398/208 |
| 2012/0308234 | A1* | 12/2012 | Bianciotto | H04B 10/614 |
| | | | | 398/65 |
| 2015/0023659 | A1* | 1/2015 | Sun | H04J 14/0221 |
| | | | | 398/34 |
| 2015/0171972 | A1* | 6/2015 | Xie | H04B 10/616 |
| | | | | 398/205 |
| 2016/0105245 | A1* | 4/2016 | Cai | H04B 10/613 |
| | | | | 398/208 |
| 2016/0261398 | A1* | 9/2016 | Liao | H04L 5/04 |
| 2016/0329970 | A1* | 11/2016 | Yao | H04L 7/02 |

FOREIGN PATENT DOCUMENTS

| | | |
|---|---|---|
| CN | 101599929 A | 12/2009 |
| CN | 101636928 A | 1/2010 |
| CN | 102725982 A | 10/2012 |
| CN | 101599929 B | 11/2012 |
| CN | 101636928 B | 12/2012 |
| JP | 3865482 | 10/2006 |
| JP | 2011-009956 A | 1/2011 |
| JP | 2011-15013 A | 1/2011 |
| JP | 2011-142583 A | 7/2011 |
| JP | 2011-166627 A | 8/2011 |
| JP | 2012-253461 A | 12/2012 |
| KR | 10-0747552 B1 | 8/2007 |
| KR | 10-2009-0041844 A | 4/2009 |
| WO | WO 2013/083190 A1 | 6/2013 |

OTHER PUBLICATIONS

European Extended Supplementary Search Report dated Jul. 21, 2017 received in European Patent Application No. 14 87 8145.3.

* cited by examiner ized optical signals, and the polarized optical signals are mixed with a local-oscillator optical signal via a 90° photomixer. The mixed optical signals are converted into baseband electric signals through a balance photoelectric detector. The photovoltaic-converted electric signals have two signals for each polarization state. Because there is crosstalk between the two polarization states and the polarization states also have rotations after passing through the transmission channel, each of the two polarization states at the receiving end has two orthogonal signals which have no corresponding relation with the transmitting signals. Then, the electric signals are converted into digital signals via an analog-to-digital converter, so that the digital signals may be processed through a digital signal processing technology.

CLOCK RECOVERY METHOD, DEVICE AND SYSTEM AND COMPUTER STORAGE MEDIUM

CROSS-REFERENCE TO RELATED APPLICATION

This application is the 371 National Phase of PCT Application No. PCT/CN2014/074566, filed Apr. 1, 2014, which is based upon and claims priority to Chinese Patent Application No. 201410012704.0, filed Jan. 10, 2014, the entire contents of which are incorporated herein by reference.

TECHNICAL FIELD

The present disclosure relates to a clock recovery technology in the communication field, and more particularly, to a clock recovery method, device and system, and a computer storage medium.

BACKGROUND

With the increase of internet traffic, an optical communication system in a trunking system requires a greater capacity. When a bit rate per wavelength increases, the chromatic dispersion, polarization mode dispersion and various non-linear effects on a transmission path lead to waveform distortion, which results in poor quality of information.

FIG. 1 is block diagram of a typical digital coherent receiver. The digital coherent receiver receives an optical signal, and the received optical signal is divided into two mutually orthogonal signals in a polarization state by a polarization splitter. The polarization splitter outputs the polar- Compared with an incoherent technology, a digital coherent receiving technology has the following advantages: about 3 dB OSNR (optical signal to noise ratio) gain is achieved; an electric equalization technology may be conveniently used to cope with channel variations, reduce the cost, and the like; and a more effective modulation technology and polarization multiplexing technology can be employed to improve the transmission capacity.

In the digital coherent receiver, the equalization of chromatic dispersion and polarization mode dispersion is generally completed by two parts. Firstly, a static dispersion is compensated, wherein a Fast Fourier Transformation (FFT) technology is usually employed to perform a fast frequency domain convolution so as to complete the compensation of the static dispersion; and then residual chromatic dispersion and polarization mode dispersion are compensated, wherein a Finite Impulse Response (FIR) butterfly equalizer is employed for implementing the compensation, and the FIR butterfly filter employs a self-adaptive algorithm to update coefficients so as to track and compensate the polarization mode dispersion dynamically changed with time. The FIR butterfly self-adaptive equalizer has the functions of equalization, matched filtering and phase adjustment. However, when a sampling frequency deviation exists or a sampling phase changing range exceeds a range adjusted by the FIR butterfly self-adaptive equalizer, the FIR butterfly self-adaptive equalizer cannot work normally. Therefore, it is required to place a clock phase recovery device before the FIR butterfly equalizer, for evaluating the phase error of the input time/frequency domain signal, and performing a phase adjustment on the input time/frequency domain signal so as to ensure that a stable and proper sampling phase is provided to the self-adaptive equalizer.

The clock phase recovery methods in the related arts include a square clock recovery algorithm, and a Gardner clock recovery algorithm, and during the process of implementing the present disclosure, it is found that the existing clock phase recovery solution at least has the following defects:

because the differential group delay and the polarization rotation angle of the polarization mode dispersion change with time, the phase of the input time/frequency domain signal would be affected by the polarization mode dispersion; moreover, when the differential group delay is a half period while the polarization angle forms a 45-degree angle with the principal state of polarization at the receiving end, the existing clock phase recovery solution cannot extract the phase error of the input time/frequency domain signal, and at this moment the clock phase recovery cannot be implemented.

SUMMARY

Accordingly, the embodiments of the present disclosure are expected to provide a clock recovery method, device and system, and a computer storage medium, which can accurately extract the phase error of the input time/frequency signal, and restore the phase of the input time/frequency signal better.

To fulfill the foregoing objects, the technical solutions of the present disclosure are implemented as follows.

The embodiments of the present disclosure provide a clock recovery method, including:

performing a clock equalization pre-filtering on an input time/frequency domain signal according to a currently inputted self-adaptive equalization coefficient, so as to obtain an equalization pre-filtering signal;

acquiring a phase error of the input time/frequency domain signal according to the equalization pre-filtering signal; and performing a phase adjustment on the input time/frequency domain signal according to the phase error and performing a self-adaptive equalization processing on the phase-adjusted time/frequency domain signal to output a new self-adaptive equalization coefficient.

In the foregoing solution, the time/frequency domain signal includes a first time/frequency domain sub-signal according to a first optical polarization and a second time/frequency domain sub-signal according to second optical polarization, wherein the time/frequency domain signal is generated by converting a time domain signal into a frequency domain signal through a time-frequency conversion.

In the foregoing solution, the performing the clock equalization pre-filtering on the input time/frequency domain signal according to the currently inputted self-adaptive equalization coefficient specifically employs the following manner:

$$\begin{cases} X_{pd}(k) = X(k)H_{xx}(k) + Y(k)H_{xy}(k) \\ Y_{pd}(k) = X(k)H_{yx}(k) + Y(k)H_{yy}(k) \end{cases},$$

$$k \in K \cup \left(K + \frac{N}{2}\right), K = \left(\frac{N}{8}, \ldots \frac{3N}{8} - 1\right)$$

wherein, $H_{xx}(k)$, $H_{xy}(k)$, $H_{yx}(k)$ and $H_{yy}(k)$ are frequency domain self-adaptive equalization coefficients, K is a frequency point index for phase discrimination, X(k) is a first frequency domain polarization sub-signal, Y(k) is a second frequency domain polarization sub-signal, $X_{pd}(k)$ and $Y_{pd}(k)$ are equalization pre-filtering signals obtained after the clock equalization pre-filtering.

In the foregoing solution, the acquiring the phase error of the input frequency domain signal according to the equalization pre-filtering signal specifically employs the following manner:

$$C = \sum_{k=0}^{\frac{N}{2}-1} \left\{ X_{pd}(k)X_{pd}^*\left(k + \frac{N}{2}\right) + Y_{pd}(k)Y_{pd}^*\left(k + \frac{N}{2}\right) \right\}$$

wherein, $X_{pd}(k)$ and $Y_{pd}(k)$ are equalization pre-filtering signals obtained after the clock equalization pre-filtering; $X^*_{pd}(k)$ and $Y_{pd}^*(k)$ are complex conjugate signals of the equalization pre-filtering signals; and the phase value of C is calculated according to the following formula to obtain the phase error μ between the input and output frequency domain signals:

$$\mu = -\frac{1}{2\pi}\arg(C)$$

wherein, the value range of the phase error μ is [0,1).

In the foregoing solution, the performing the phase adjustment on the input frequency domain signal according to the phase error includes:

acquiring a phase adjustment angle η(k) according to the following formula:

$$\eta(k) = \begin{cases} \mu \times \frac{2k}{N}, 0 \le k \le \frac{N}{2} - 1 \\ \mu \times \frac{2(k-N)}{N}, \frac{N}{2} \le k \le N - 1 \end{cases}, k = 0, \ldots, N-1$$

wherein, μ is the phase error, and a phase adjustment is performed on X(k) and Y(k) according to the phase adjustment angle η(k) using the following formula:

$$\begin{cases} X_{cr}(k) = X(k)e^{i2\pi\eta(k)} \\ Y_{cr}(k) = Y(k)e^{i2\pi\eta(k)} \end{cases}, k = 0, \ldots, N-1$$

wherein, X(k) is the first frequency domain polarization sub-signal, Y(k) is the second frequency domain polarization sub-signal, and $X_{cr}(k)$ and $Y_{cr}(k)$ are frequency domain signals obtained after the phase adjustment.

In the foregoing solution, the performing the phase adjustment on the input time domain signal according to the phase error includes:

specifically employing the following manner to perform a phase adjustment on the input time domain signal using a cubic Lagrange interpolation algorithm:

$$z[k] = \sum_{i=-2}^{1} a_i f[k-i]$$

wherein, the coefficients are:

$$\begin{cases} a_{-2} = \frac{(u+1)u(u-1)}{6} \\ a_{-1} = \frac{(u+1)u(u-2)}{-2} \\ a_0 = \frac{(u+1)(u-1)(u-2)}{2} \\ a_1 = \frac{(u-1)u(u-2)}{-6} \end{cases}$$

wherein, z[k] is a sample point value obtained by interpolating a sample point f[k] to a k+μ position through a decimal pointer μ; if every 128 sample points use the same interpolation decimal pointer μ, then the decimal pointer μ=mod(2×μ, 1), and μ is the phase error.

In the foregoing solution, the method, after acquiring the phase error of the input time/frequency domain signal according to the equalization pre-filtering signal, further includes:

filtering the phase error to obtain a filtered phase error; and performing a phase adjustment on the input time/frequency domain signal according to the filtered phase error, performing a self-adaptive equalization processing on the phase-adjusted time/frequency domain signal, and then outputting a new self-adaptive equalization coefficient.

The embodiments of the present disclosure provide a clock recovery method, including: an equalization pre-filtering unit, a timing error extraction unit and a phase adjustment unit connected in sequence, wherein:

the equalization pre-filtering unit is configured to perform a clock equalization pre-filtering on an input time/frequency domain signal according to a currently inputted self-adaptive equalization coefficient, the equalization pre-filtering signal obtained being input to the timing error extraction unit;

the timing error extraction unit is configured to acquire a phase error of the input time/frequency domain signal according to the equalization pre-filtering signal, the obtained phase error being input to the phase adjustment unit; and the phase adjustment unit is configured to perform a phase adjustment on the input time/frequency domain signal according to the phase error, perform a self-adaptive equalization processing on the phase-adjusted time/frequency domain signal to output a new self-adaptive equalization coefficient, and feed the new self-adaptive equalization coefficient back to the equalization pre-filtering unit.

In the foregoing solution, the time/frequency domain signal includes a first time/frequency domain sub-signal according to first optical polarization and a second time/frequency domain sub-signal according to second optical polarization, wherein the time/frequency domain signal is generated by converting a time domain signal into a frequency domain signal through a time-frequency conversion.

In the foregoing solution, the device further includes:

a timing error filtering unit connected between the timing error extraction unit and the phase adjustment unit, and configured to filter the phase error, the filtered phase error being input to the phase adjustment unit; and the phase adjustment unit being further configured to perform a phase adjustment on the input time/frequency domain signal according to the filtered phase error, perform a self-adaptive equalization processing on the phase-adjusted time/frequency domain signal, and output a new self-adaptive equalization coefficient.

In the foregoing solution, the timing error filtering unit includes a loop filter, a digital oscillator and a subtractor.

In the foregoing solution, the equalization pre-filtering unit includes a finite impulse response (FIR) filter of a single polarization system or an FIR filter of a polarization multiplexing system.

The embodiments of the present disclosure provide a clock recovery system, including: the clock recovery device as described above and a self-adaptive equalizer, wherein:

the clock recovery device inputs the phase-adjusted time/frequency domain signal to the self-adaptive equalizer; and the self-adaptive equalizer outputs a new self-adaptive equalization coefficient according to the phase-adjusted time/frequency domain signal, and feeds the new self-adaptive equalization coefficient back to the input end of the clock recovery device.

The embodiments of the present disclosure also provide a computer storage medium, wherein the computer storage medium is stored with a computer-executable instruction, and the computer-executable instruction is configured to perform the aforementioned clock recovery method.

According to the clock recovery method, device and system, and the computer storage medium provided by the embodiments of the present disclosure, clock equalization pre-filtering is performed on the input time/frequency domain signal according to the self-adaptive equalization coefficient inputted currently to obtain the equalization pre-filtering signal; the phase error of the input time/frequency domain signal is acquired according to the equalization pre-filtering signal; and phase adjustment is performed on the input time/frequency domain signal according to the phase error, and the new self-adaptive equalization coefficient is outputted after self-adaptive equalization processing is performed on the phase-adjusted time/frequency domain signal. In this manner, the self-adaptive equalization coefficient can be self-adaptively adjusted and fed back continuously to obtain a new self-adaptive equalization coefficient, and the new self-adaptive equalization coefficient can be employed in each time when performing clock equalization pre-filtering on the time/frequency domain signal, thereby the dynamic change of a channel can be tracked more preferably, and channel distortion can be compensated exactly, so that the effect of the clock equalization pre-filtering is better, and it is capable of quickly and exactly extracting the phase error of the input time/frequency signal, and restoring the phase of the input time/frequency signal more preferably, i.e., adjusting the sampling positions more preferably.

DETAILED DESCRIPTION

In the embodiments of the present disclosure, clock equalization pre-filtering is performed on an input time/frequency domain signal according to a self-adaptive equalization coefficient input currently, to obtain an equalization pre-filtering signal; a phase error of the input time/frequency domain signal is acquired according to the equalization pre-filtering signal; and phase adjustment is performed on the input time/frequency domain signal according to the phase error, and a new self-adaptive equalization coefficient is output after self-adaptive equalization processing is performed on the phase-adjusted time/frequency domain signal. In this manner, the self-adaptive equalization coefficient can be adjusted continuously, the dynamic change of a channel can be tracked more preferably, and channel distortion can be compensated exactly, so that the effect of the clock equalization pre-filtering is better, so as to be capable of quickly and exactly extracting the phase error of the input time/frequency signal, and restoring the phase of the input time/frequency signal more preferably.

Here, the currently input self-adaptive equalization coefficient is a self-adaptive equalization coefficient output and fed back after the self-adaptive equalization processing is performed on the input phase-adjusted time/frequency domain signal by a self-adaptive equalizer. The originally inputted self-adaptive equalization coefficient is preset by a system, and the time/frequency domain signal includes a first time/frequency domain sub-signal according to first optical polarization and a second time/frequency domain sub-signal according to second optical polarization; and the time domain signal becomes the frequency domain signal through a time-frequency conversion.

The embodiments of the present disclosure would be further described in details hereinafter with reference to the drawings.

Figure 1:
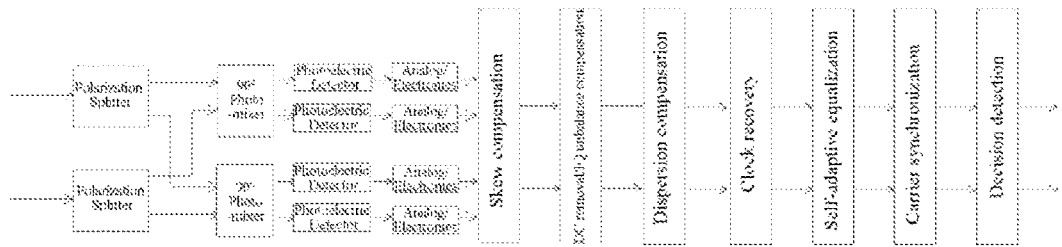
FIG. 1 is a block diagram of an existing digital coherent receiver.
Figure 2:
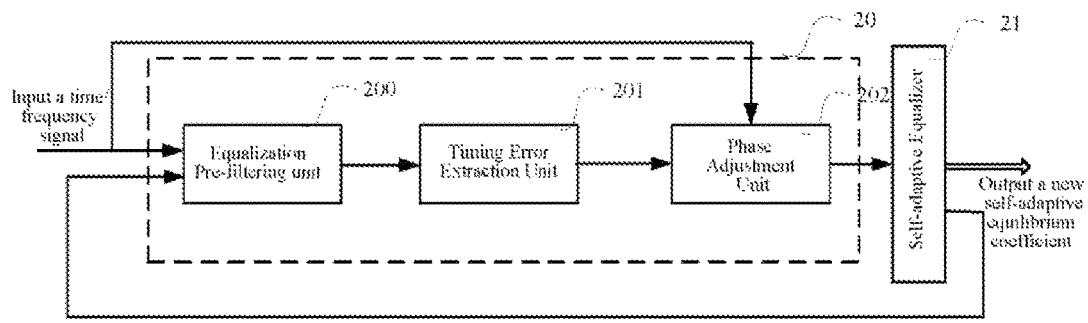
FIG. 2 is a block diagram showing a structure of a first clock recovery system according to the embodiments of the present disclosure.

FIG. 2 is a block diagram showing a structure of a clock recovery system provided by the embodiments of the present disclosure. As shown in FIG. 2, the system includes: a clock recovery device 20 and a self-adaptive equalizer 21, wherein the clock recovery device 20 includes an equalization pre-filtering unit 200, a timing error extraction unit 201 and a phase adjustment unit 202 connected in sequence, and the foregoing functional modules may either be software functional modules or hardware devices.

The clock recovery device 20 inputs the phase-adjusted time/frequency domain signal to the self-adaptive equalizer 21; and the self-adaptive equalizer 21 outputs a new self-adaptive equalization coefficient according to the phase-adjusted time/frequency domain signal, and feeds back the new coefficient to the input end of the clock recovery device 20.

In the clock recovery device 20, the equalization pre-filtering unit 200 is configured to perform clock equalization pre-filtering on an input time/frequency domain signal according to a self-adaptive equalization coefficient input currently, the equalization pre-filtering signal obtained being input to the timing error extraction unit 201.

The self-adaptive equalization coefficient input currently is the self-adaptive equalization coefficient output and fed back after self-adaptive equalization processing is performed on the input phase-adjusted time/frequency domain signal by the self-adaptive equalizer, and the initially inputted self-adaptive equalization coefficient is preset by a system; and the time/frequency domain signal includes a first time/frequency domain sub-signal according to first optical polarization and a second time/frequency domain sub-signal according to second optical polarization, the time domain signal becoming the frequency domain signal through time-frequency conversion.

The timing error extraction unit 201 is configured to acquire a phase error of the input time/frequency domain signal according to the input equalization pre-filtering signal, the phase error obtained being input to the phase adjustment unit 202.

The phase adjustment unit 202 is configured to perform phase adjustment on the input time/frequency domain signal according to the input phase error, and input the phase-adjusted time/frequency domain signal to the self-adaptive equalizer 21, so that the self-adaptive equalizer 21 outputs a new self-adaptive equalization coefficient and feeds back the new coefficient to the equalization pre-filtering unit 200.

Based on the foregoing system structure, the clock recovery process provided by the embodiments of the present disclosure is particularly implemented as follows.

Firstly, the equalization pre-filtering unit 200 performs clock equalization pre-filtering on the input time/frequency domain signal according to the self-adaptive equalization coefficient input currently, and inputs the obtained equalization pre-filtering signal to the timing error extraction unit 201.

Then, the timing error extraction unit 201 acquires the phase error of the input time/frequency domain signal according to the equalization pre-filtering signal, and inputs the obtained phase error to the phase adjustment unit 202.

Finally, the phase adjustment unit 200 performs phase adjustment on the input time/frequency domain signal according to the phase error, and inputs the phase-adjusted time/frequency domain signal to the self-adaptive equalizer 21, so that the self-adaptive equalizer 21 feeds back the updated self-adaptive equalization coefficient to the input end of the equalization pre-filtering unit 200.

The initially inputted self-adaptive equalization coefficient is set by the system according to such parameters as the frequency and the phase of the input signal.

Figure 3:
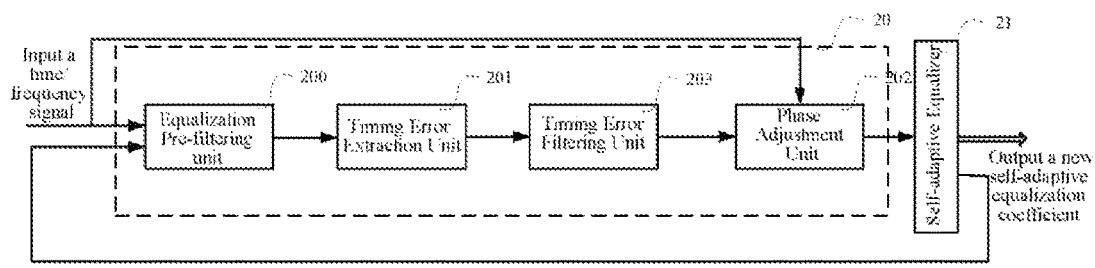
FIG. 3 is a block diagram showing a structure of a second clock recovery system according to the embodiments of the present disclosure.

Preferably, the clock recovery device further includes a timing error filtering unit 203 as shown in FIG. 3.

The timing error filtering unit 203 is connected between the timing error extraction unit 201 and the phase adjustment unit 202, and is configured to filter the phase error, and input the phase error after the filtering to the phase adjustment unit 202.

The phase adjustment unit 200 is further configured to perform phase adjustment on the input time/frequency domain signal according to the input phase error after the filtering, and input the phase-adjusted time/frequency domain signal to the self-adaptive equalizer 21, so that the self-adaptive equalizer 21 outputs a new self-adaptive equalization coefficient.

To facilitate description, parts of the above clock recovery system are divided into various modules or units by functions and are respectively described. Certainly, the functions of the modules or units may be implemented in one or more software or hardware while implementing the present disclosure.

Figure 4:
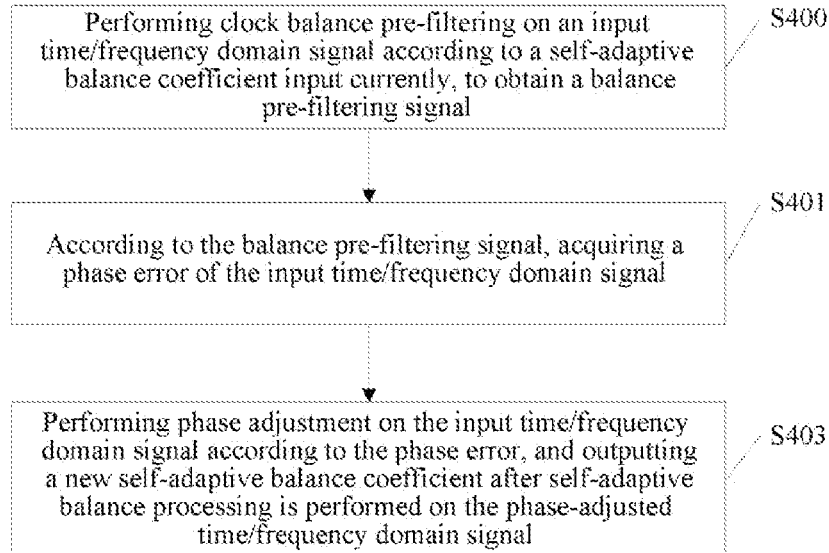
FIG. 4 is a block diagram showing an implementation flow of a first clock recovery method according to the embodiments of the present disclosure.

Based on the above system structure, the embodiments of the present disclosure provide a clock recovery method, as shown in FIG. 4, including the following steps.

At step S400, clock equalization pre-filtering is performed on an input time/frequency domain signal according to a self-adaptive equalization coefficient input currently, to obtain an equalization pre-filtering signal.

The step may be implemented by the equalization pre-filtering unit 200 in the clock recovery device 20.

In this step, the self-adaptive equalization coefficient input currently is the self-adaptive equalization coefficient output and fed back after performing self-adaptive equalization processing on the input phase-adjusted time/frequency domain signal by the self-adaptive equalizer, and the initially inputted self-adaptive equalization coefficient is preset by a system. The time/frequency domain signal includes a first time/frequency domain sub-signal according to first optical polarization such as x polarization and a second time/frequency domain sub-signal according to second optical polarization such as y polarization.

In this step, the filtering of the equalization pre-filtering unit 200 may either be implemented in a time domain or in a frequency domain. The input signal may either be a time domain signal or a frequency domain signal, and the corresponding output may either be a time domain signal or a frequency domain signal.

If it is needed to input a frequency domain signal, then before inputting a time domain signal to the equalization pre-filtering unit 200, it is necessary to convert the time domain signal into a frequency domain signal through a module or device having a time-frequency conversion function such as a Fourier transformation module, and then input the obtained frequency domain signal to the equalization pre-filtering unit 200. If the self-adaptive equalization coefficient fed back by the self-adaptive equalizer is a time domain coefficient, and a frequency domain coefficient is needed, then it is necessary to add a time-frequency conversion unit between the self-adaptive equalizer and the equalization pre-filtering unit 200; or, a module having the time-frequency conversion function is added in the equalization pre-filtering unit 200 to convert the time domain coefficient fed back by the self-adaptive equalizer into a frequency domain coefficient.

The equalization pre-filtering unit 200 may be implemented by using an FIR filter of a single polarization system or an FIR filter of a polarization multiplexing system.

In this step, when inputting a frequency domain signal and a frequency domain self-adaptive equalization coefficient, the equalization pre-filtering unit 200 performs clock equalization pre-filtering on the input frequency domain signal, specifically employing the following manner $$\begin{cases} X_{pd}(k) = X(k)H_{xx}(k) + Y(k)H_{xy}(k) \\ Y_{pd}(k) = X(k)H_{yx}(k) + Y(k)H_{yy}(k) \end{cases},$$

$$k \in K \cup \left(K + \frac{N}{2}\right), K = \left(\frac{N}{8}, \ldots \frac{3N}{8} - 1\right)$$

wherein, $H_{xx}(k)$, $H_{xy}(k)$, $H_{yx}(k)$ and $H_{yy}(k)$ are frequency domain self-adaptive equalization coefficients, K is a frequency point index for phase discrimination, X(k) is a first frequency domain polarization sub-signal, Y(k) is a second frequency domain polarization sub-signal, and $X_{pd}(k)$ and $Y_{pd}(k)$ are equalization pre-filtering signals obtained after the clock equalization pre-filtering, and the obtained equalization pre-filtering signal is input to the timing error extraction unit 201.

In this step, the equalization pre-filtering unit 200 employs the self-adaptive equalization coefficient fed back by the self-adaptive equalizer to perform clock equalization pre-filtering on the time/frequency domain signal, so that the dynamic change of a channel can be tracked more preferably, and channel distortion can be compensated exactly, so that the effect of the clock equalization pre-filtering is better, so as to be capable of quickly and exactly extracting the phase error of the input time/frequency signal, and restoring the phase of the input time/frequency signal more preferably.

At step S401, a phase error of the input time/frequency domain signal is acquired according to the equalization pre-filtering signal.

This step may be implemented by the timing error extraction unit 201 in the clock recovery device.

In this step, the error extracting of the timing error extraction unit 201 may be implemented in a time domain or in a frequency domain. The input time/frequency signal may either be a time domain signal or a frequency domain signal, and the corresponding output may either be a time domain signal or a frequency domain signal.

Usually, the timing error extraction unit 201 may employ a square timing error extraction algorithm or the like to extract the phase error of the input time domain signal; and may employ a Godard algorithm or the like to extract the phase error of the input frequency domain signal. The extraction algorithm of the phase error is not specifically defined herein.

In this step, the equalization pre-filtering signal is the frequency domain equalization pre-filtering signal obtained in the foregoing step S400; therefore, the timing error extraction unit 201 may employ a Godard algorithm to acquire the phase error of the input frequency domain signal according to the equalization pre-filtering signal, wherein the particular implementation manner is as follows:

$$C = \sum_{k=0}^{\frac{N}{2}-1} \left\{ X_{pd}(k)X_{pd}^*\left(k + \frac{N}{2}\right) + Y_{pd}(k)Y_{pd}^*\left(k + \frac{N}{2}\right) \right\}$$

wherein, $X_{pd}(k)$ and $Y_{pd}(k)$ are equalization pre-filtering signals obtained after the clock equalization pre-filtering; $X^*_{pd}(k)$ and $Y_{pd}^*(k)$ are complex conjugate signals of the equalization pre-filtering signals; and the phase value of C is calculated according to the following formula to obtain the phase error µ of the input frequency domain signals:

$$\mu = -\frac{1}{2\pi}\arg(C)$$

wherein the value range of the phase error µ is [0,1), and obtained the phase error is input to the phase adjustment unit 202.

In this step, the timing error extraction unit 201 acquires the phase error of the input time/frequency domain signal according to the equalization pre-filtering signal, wherein the equalization pre-filtering signal is a signal obtained by performing clock equalization pre-filtering on the input time/frequency domain signal by the equalization pre-filtering unit 200 using the self-adaptive equalization coefficient fed back by the self-adaptive equalizer 21; in this way, the timing error extraction unit 201 can extract the phase error of the input time/frequency domain signal more exactly.

At step S403, phase adjustment is performed on the input time/frequency domain signal according to the phase error, and a new self-adaptive equalization coefficient is output after self-adaptive equalization processing is performed on the phase-adjusted time/frequency domain signal.

This step may be implemented by the phase adjustment unit 202 in the clock recovery device 20.

In this step, if a frequency domain signal is input to the phase adjustment unit 202, then performing the phase adjustment on the input frequency domain signal according to the phase error obtained in the foregoing step S401 specifically employs the following manner:

acquiring a phase adjustment angle η(k) according to the following formula:

$$\eta(k) = \begin{cases} \mu \times \frac{2k}{N}, 0 \le k \le \frac{N}{2} - 1 \\ \mu \times \frac{2(k-N)}{N}, \frac{N}{2} \le k \le N - 1 \end{cases}, k = 0, \ldots, N-1$$

wherein, µ is the phase error, and phase adjustment is performed on X(k) and Y(k) according to the phase adjustment angle η(k) using the following formula:

$$\begin{cases} X_{cr}(k) = X(k)e^{i2\pi\eta(k)} \\ Y_{cr}(k) = Y(k)e^{i2\pi\eta(k)} \end{cases}, k = 0, \ldots, N-1$$

wherein, X(k) is a first frequency domain sub-signal, Y(k) is a second frequency domain sub-signal, and $X_{cr}(k)$ and $Y_{cr}(k)$ are frequency domain signals obtained after the phase adjustment.

If a time domain signal is input to the phase adjustment unit 202, then an interpolation operation is performed on the input frequency domain signal according to the phase error obtained in the foregoing step S401 so as to adjust the phase of the input time domain signal, wherein a fraction interpolation algorithm such as a cubic Lagrange interpolation algorithm may be employed as the interpolation algorithm, and the interpolation algorithm would not be specifically defined herein.

If the cubic Lagrange interpolation algorithm is employed to perform phase adjustment on the input time domain signal, the following manner is employed specially:

$$z[k] = \sum_{i=-2}^{1} a_i f[k-i]$$

wherein, the coefficients are:

$$\begin{cases} a_{-2} = \dfrac{(u+1)u(u-1)}{6} \\ a_{-1} = \dfrac{(u+1)u(u-2)}{-2} \\ a_0 = \dfrac{(u+1)(u-1)(u-2)}{2} \\ a_1 = \dfrac{(u-1)u(u-2)}{-6} \end{cases}$$

wherein, z[k] is a sample point value obtained by interpolating a sample point f[k] to a k+μ position through a decimal pointer μ; and if every 128 sample points use the same interpolation decimal pointer μ, then the decimal pointer μ=mod(2×μ, 1), and μ is the phase error.

Figure 5:
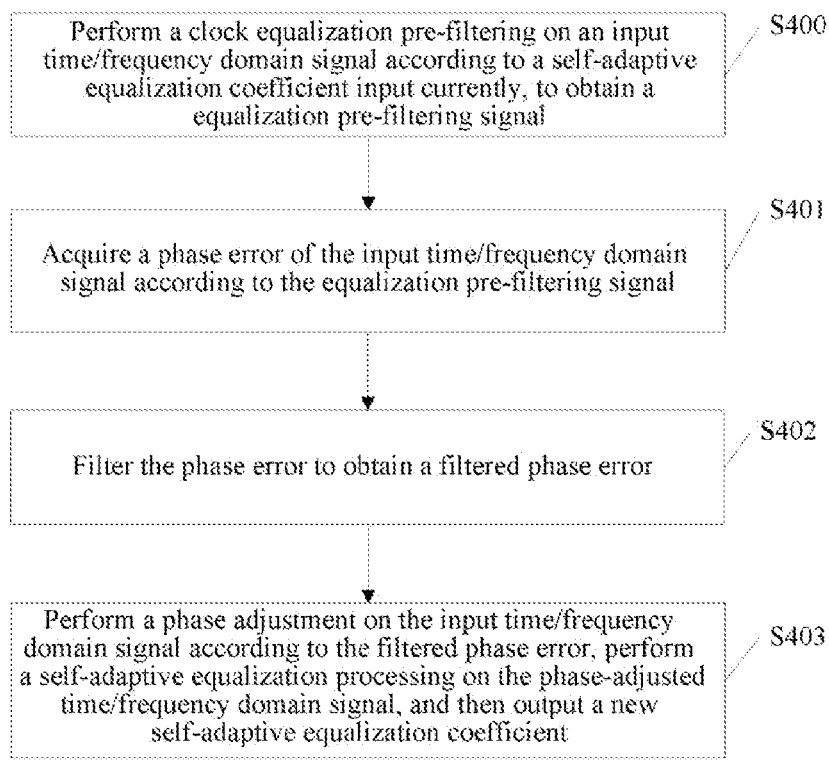
FIG. 5 is a block diagram showing an implementation flow of a second clock recovery method according to the embodiments of the present disclosure.

In another embodiment of the present disclosure, the foregoing embodiment is optimized. As shown in FIG. 5, the method, after the step S401 and before the step S403, further includes a step S402.

At step S402, the phase error is filtered to obtain a phase error after filtering.

Accordingly, the phase error used for performing phase adjustment on the time/frequency domain signal in step S403 is the phase error after the filtering in step S402.

One preferred implementation manner of step S402 is given below. The step S402 may be implemented by the timing error filtering unit 203 in the clock recovery device.

Figure 6:
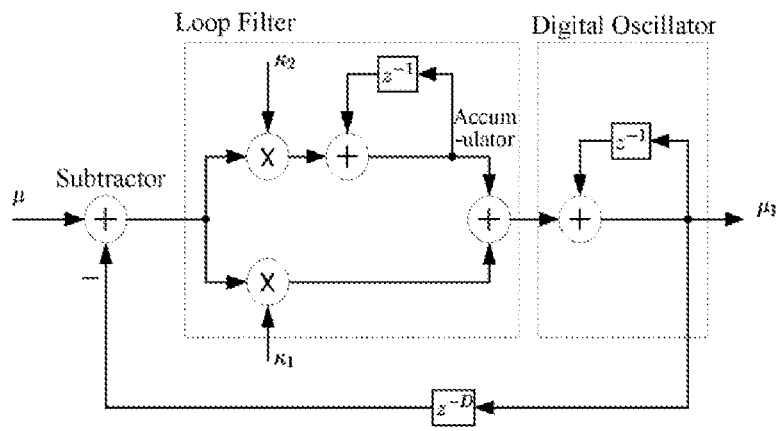
FIG. 6 is a block diagram showing an implementation structure in which a timing error filtering unit filters a phase error according to the embodiments of the present disclosure.

In this step, the timing error filtering unit 203 can be implemented using a loop filter, a digital control oscillator and a subtractor. As shown in FIG. 6, the particular implementation manner is as follows.

Firstly, the subtractor calculates a difference $\mu_e$ between the phase error μ and the filtered phase error $\mu_1$ fed back by the digital control oscillator:

$$\mu_e = \begin{cases} \mathrm{mod}(\mu - \mu_1, 1), & \mathrm{mod}(\mu - \mu_1, 1) < 0.5 \\ \mathrm{mod}(\mu - \mu_1, 1) - 1, & \mathrm{mod}(\mu - \mu_1, 1) \geq 0.5 \end{cases}$$

Then, the obtained difference $\mu_e$ is input to the loop filter.

And then, the loop filter filters the difference $\mu_e$ using a proportional gain channel and an integral gain channel usually, wherein the proportional gain channel is composed of a proportional gain module k1, while the integral gain channel is composed of an integral gain module k2 and an integrator (accumulator) connected with the integral gain module k2 in series; the results of the proportional gain channel and the integral gain channel are added as the output of the loop filter, and the output of the loop filter is input to the digital control oscillator.

Finally, the digital control oscillator which is an integrator (accumulator) feeds back the filtered phase error $\mu_1$ to the subtractor, and outputs the phase error $\mu_1$ to the phase adjustment unit 202.

In the foregoing preferred implementation manner of step S402, the filtering the phase error μ to obtain the filtered phase error $\mu_1$ not only can evaluate the phase error more exactly, but also can track timing frequency deviation. The phase error used for performing the interpolation operation on the input time/frequency domain signal in step S403 is the filtered phase error $\mu_1$ in step S402; in this way, the phase of the input time/frequency domain signal can be adjusted and restored more preferably, i.e., the sampling positions can be adjusted more preferably.

In the foregoing embodiments of the present disclosure, clock equalization pre-filtering is performed on the input time/frequency domain signal according to the self-adaptive equalization coefficient input currently, to obtain the equalization pre-filtering signal; the phase error of the input time/frequency domain signal is acquired according to the equalization pre-filtering signal; and phase adjustment is performed on the input time/frequency domain signal according to the phase error, and the new self-adaptive equalization coefficient is output after self-adaptive equalization processing is performed on the phase-adjusted time/frequency domain signal. In this manner, performing clock equalization pre-filtering on the time/frequency domain signal through the continuously updated self-adaptive equalization coefficient can implement a better clock equalization pre-filtering effect, so that the effect of the clock equalization pre-filtering is better, so as to be capable of quickly and exactly extracting the phase error of the input time/frequency signal, and restoring the phase of the input time/frequency signal more preferably, i.e., adjusting the sampling positions more preferably.

The embodiments of the present disclosure also provide a computer storage medium, wherein the computer storage medium is stored with a computer-executable instruction, and the computer-executable instruction is configured to perform the aforementioned clock recovery method.

The implementations of the present disclosure would be illustrated in details hereinafter with reference to the specific embodiments.

First Embodiment

Figure 7:
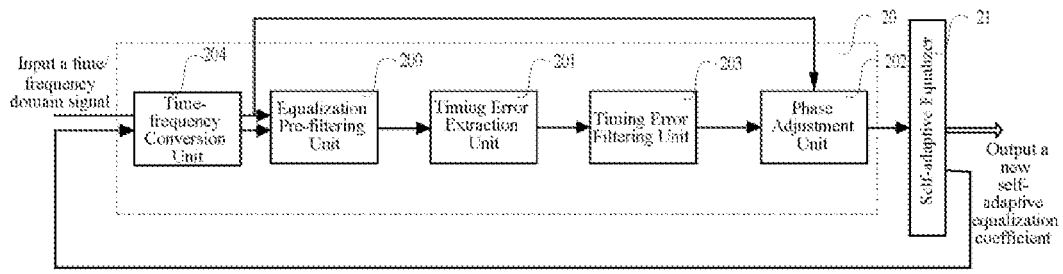
FIG. 7 is a block diagram showing a structure of a clock recovery system according to a first embodiment of the present disclosure.

In order to explain the embodiments of the present disclosure more clearly, the clock phase recovery process corresponding to a flow as shown in FIG. 4 is described hereinafter by taking a system structure as shown in FIG. 7 for example.

As shown in FIG. 7, the system includes: a clock recovery device 20 and a self-adaptive equalizer 21; the clock recovery device 20 may include: a time-frequency conversion unit 204, an equalization pre-filtering unit 200, a timing error extraction unit 201, a timing error filtering unit 203 and a phase adjustment unit 202.

In step S400, after receiving time a domain input signal including a first polarization sub-signal and a second polarization sub-signal, the time-frequency conversion unit 204 performs a FFT transformation on the two time domain signals to obtain frequency domain signals. Herein, considering that the output of the time-frequency conversion unit 204 is namely the input of the phase adjustment unit 202, the input data of the time-frequency conversion unit 204 needs to be stacked by a certain points; if the sample points of the time domain signal inputted each time are 128, it may select to stack 32 points to perform FFT transformation with N=160 points:

$$\begin{cases} X(k) = \sum_{n=0}^{N-1} x(n)e^{-i\frac{2\pi nk}{N}} \\ Y(k) = \sum_{n=0}^{N-1} y(n)e^{-i\frac{2\pi nk}{N}} \end{cases}, k = 0, \ldots, N-1$$

wherein, x(n) is a first time domain polarization sub-signal, and y(n) is a second time domain polarization sub-signal; the time-frequency conversion unit 204 performs FFT transformation to obtain two frequency domain signals X(k) and Y(k) in a state of polarization, and input them to the equalization pre-filtering unit 200 and the phase adjustment unit 202.

After inputting the two frequency domain signals in a state of polarization and the frequency domain self-adaptive equalization coefficient input currently, the equalization pre-filtering unit 200 performs clock equalization pre-filtering on the input frequency domain signal according to the self-adaptive equalization coefficient input currently, specifically employing the following manner:

$$\begin{cases} X_{pd}(k) = X(k)H_{xx}(k) + Y(k)H_{xy}(k) \\ Y_{pd}(k) = X(k)H_{yx}(k) + Y(k)H_{yy}(k) \end{cases},$$

$$k \in K \cup \left(K + \frac{N}{2}\right), K = \left(\frac{N}{8}, \dots \frac{3N}{8} - 1\right)$$

wherein, $H_{xx}(k)$, $H_{xy}(k)$, $H_{yx}(k)$ and $H_{yy}(k)$ are frequency domain self-adaptive equalization coefficients, K is a frequency point index for phase discrimination, X(k) is a first frequency domain polarization sub-signal, Y(k) is a second frequency domain polarization sub-signal, $X_{pd}(k)$ and $Y_{pd}(k)$ are equalization pre-filtering signals obtained after the clock equalization pre-filtering, and the obtained equalization pre-filtering signal is input to the timing error extraction unit 201.

In step S401, the timing error extraction unit 201 may employ a Godard algorithm to acquire the phase error of the input frequency domain signal according to the equalization pre-filtering signal, wherein the specific implementation manner is as follows:

$$C = \sum_{k=0}^{\frac{N}{2}-1} \left\{ X_{pd}(k)X_{pd}^*\left(k+\frac{N}{2}\right) + Y_{pd}(k)Y_{pd}^*\left(k+\frac{N}{2}\right) \right\}$$

wherein, $X_{pd}(k)$ and $Y_{pd}(k)$ are equalization pre-filtering signals obtained after the clock equalization pre-filtering, and $X^*_{pd}(k)$ and $Y_{pd}^*(k)$ are complex conjugate signals of the equalization pre-filtering signals; and the phase of C is calculated according to the following formula, i.e., the phase error μ of the input frequency domain signal:

$$\mu = -\frac{1}{2\pi}\arg(C)$$

wherein, the value range of the phase error μ is [0,1). The phase error μ is input to the phase adjustment unit 202.

At step S402, the phase error μ is filtered to obtain a filtered phase error $\mu_1$.

In step S403, phase adjustment is performed on the frequency domain signal according to the filtered phase error $\mu_1$, specifically employing the following manner:

acquiring a phase adjustment angle η(k) according to the following formula:

$$\eta(k) = \begin{cases} \mu_1 \times \frac{2k}{N}, 0 \leq k \leq \frac{N}{2} - 1 \\ \mu_1 \times \frac{2(k-N)}{N}, \frac{N}{2} \leq k \leq N - 1 \end{cases}, k = 0, \dots, N-1$$

wherein, $\mu_1$ is the filtered phase error, and phase adjustment is performed on X(k) and Y(k) according to the phase adjustment angle η(k) using the following formula:

$$\begin{cases} X_{cr}(k) = X(k)e^{i2\pi\eta(k)} \\ Y_{cr}(k) = Y(k)e^{i2\pi\eta(k)} \end{cases}, k = 0, \dots, N-1$$

wherein, X(k) is a first frequency domain polarization sub-signal, Y(k) is a second frequency domain polarization sub-signal, and $X_{cr}(k)$ and $Y_{cr}(k)$ are frequency domain signals obtained after the phase adjustment. The phase-adjusted frequency domain signal is input to the self-adaptive equalizer 21; and then the self-adaptive equalizer performs self-adaptive butterfly filtering, outputs an updated self-adaptive equalization coefficient, and feeds back the updated coefficient to the input end of the equalization pre-filtering unit 200.

It should be illustrated that during the process of performing phase adjustment on the frequency domain signal, sample points may be added or deleted, and control signals for adding or deleting the sample points need to be output to the self-adaptive equalizer. A calculation method for adding or deleting the sample points is as follows: a current phase discrimination value $\mu_1$ is recorded as mu1, and a prior phase discrimination value $\mu_1$ is recorded as mu0, and then a difference between mu1 and mu0 is calculated.

$$dmu = mu1 - mu0$$

A control signal num_add is calculated. When mu1<0.5 and dmu<−0.5, the value of num_add is −1; and when mu1≥0.5 and dmu≥0.5, the value of num_add is 1; for other cases, the value of num_add is 0.

When num_add is 0, the data outputs 128 sample points through the self-adaptive equalizer; when num_add is −1, the data outputs 126 sample points through the self-adaptive equalizer; and when num_add is 1, the data outputs 130 sample points through the self-adaptive equalizer.

Second Embodiment

Figure 8:
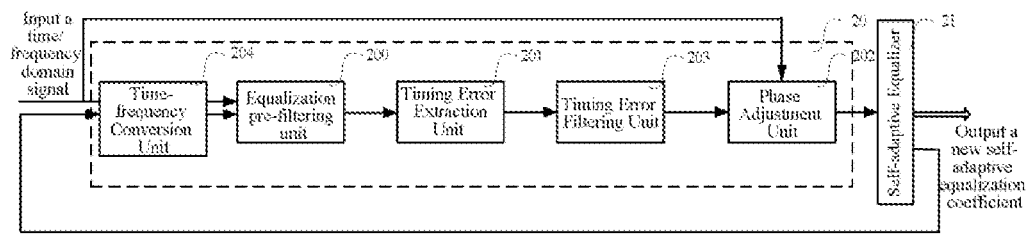
FIG. 8 is a block diagram showing a structure of a clock recovery system according to a second embodiment of the present disclosure.

The clock recovery process corresponding to the flow as shown in FIG. 4 is described by taking the system structure as shown in FIG. 8 for example.

As shown in FIG. 8, the system includes: a clock recovery device 20 and a self-adaptive equalizer 21; the clock recovery device may include: a time-frequency conversion unit 204, an equalization pre-filtering unit 200, a timing error extraction unit 201, a timing error filtering unit 203 and a phase adjustment unit 202.

The step S400, the step S401 and the step S402 are as described in the foregoing embodiments.

In step S403, an interpolation operation is performed on the input time domain signal according to the filtered phase error $\mu_1$, specifically employing the following manner:

if a cubic Lagrange interpolation algorithm is employed, the specific implementation manner is as follows:

adjusting the phase of the input time domain signal according to the following manner:

$$z[k] = \sum_{i=-2}^{I} a_i f[k-i]$$

wherein, the coefficients are:

$$\begin{cases} a_{-2} = \dfrac{(u+1)u(u-1)}{6} \\ a_{-1} = \dfrac{(u+1)u(u-2)}{-2} \\ a_0 = \dfrac{(u+1)(u-1)(u-2)}{2} \\ a_1 = \dfrac{(u-1)u(u-2)}{-6} \end{cases}$$

wherein, z[k] is a sample point value obtained by interpolating a sample point f[k] to a k+µ position through a decimal pointer µ; and if every 128 sample points use the same interpolation decimal pointer µ, then the decimal pointer µ=mod(2×µ$_1$, 1), and µ1 is the filtered phase error.

It should be illustrated that during the process of the digital interpolation operation, sample points would be added or deleted, and control signals for adding or deleting the sample points need to be output to the self-adaptive equalizer. A calculation method for adding or deleting the sample points is as follows: marking a current phase discrimination value µ$_1$ as mu1, marking a prior phase discrimination value µ$_1$ as mu0, and calculating a difference between mu1 and mu0.

$$dmu = mu1 - mu0$$

A control signal num_add is calculated. When mu1<0.5 and dmu<−0.5, the value of num_add is −1; when mu1≥0.5 and dmu≥0.5, the value of num_add is 1; for other cases, the value of num_add is 0.

When num_add is 0, 128 sample points are output through the self-adaptive equalizer from the data; when num_add is −1, 126 sample points are output through the self-adaptive equalizer from the data; and when num_add is 1, 130 sample points are output through the self-adaptive equalizer from the data.

Preferably, after the time domain signal after the interpolation operation is obtained, sample points can be added or deleted for the time domain signal after the interpolation operation, and the time domain signal after adding or deleting the sample points is input to the self-adaptive equalizer, and the self-adaptive equalizer outputs an updated self-adaptive equalization coefficient.

Based on the same technical concept, the embodiments of the present disclosure also provide a clock recovery device and system. Because the principles of the clock recovery device and system for solving problems are similar to the method, the implementation of the device can refer to the implementation of the method, and the repeated portions would not be elaborated.

Figure 9:
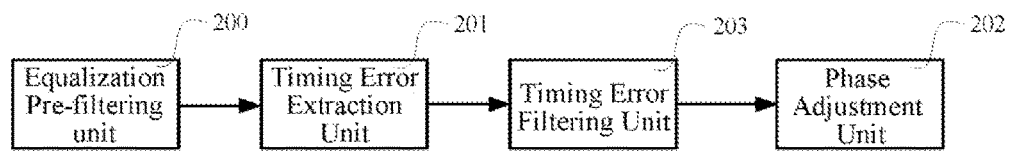
FIG. 9 is a block diagram showing a structure of a clock recovery device according to the embodiments of the present disclosure.

As shown in FIG. 9, the clock recovery device provided by the embodiment of the present disclosure may include: an equalization pre-filtering unit 200, a timing error extraction unit 201 and a phase adjustment unit 202 connected in sequence.

The equalization pre-filtering unit 200 is configured to perform clock equalization pre-filtering on an input time/frequency domain signal according to a self-adaptive equalization coefficient input currently, the obtained equalization pre-filtering signal being input to the timing error extraction unit.

The timing error extraction unit 201 is configured to acquire a phase error of the input time/frequency domain signal according to the equalization pre-filtering signal, the obtained phase error being input to the phase adjustment unit.

The phase adjustment unit 202 is configured to perform phase adjustment on the input time/frequency domain signal according to the phase error, output a new self-adaptive equalization processing after self-adaptive equalization processing is performed on the phase-adjusted time/frequency domain signal, and feed back the new coefficient to the equalization pre-filtering unit.

The time/frequency domain signal includes a first time/frequency domain sub-signal according to first optical polarization and a second time/frequency domain sub-signal according to second optical polarization, the time domain signal becoming the frequency domain signal through time-frequency conversion; and the equalization pre-filtering unit is implemented by using a finite impulse response FIR filter of a single polarization system or an FIR filter of a polarization multiplexing system.

The division manner of the above functional modules is merely a preferred implementation manner given by the embodiments of the present disclosure, and the division manner of the above functional modules is not intend to limit the present disclosure.

During specific implementation, the device further includes:

a timing error filtering unit 203 connected between the timing error extraction unit and the phase adjustment unit, and configured to filter the phase error, the phase error after filtering being input to the phase adjustment unit; and the phase adjustment unit 202 being further configured to perform phase adjustment on the input time/frequency domain signal according to the phase error after the filtering, and output a new self-adaptive equalization coefficient after self-adaptive equalization processing is performed on the phase-adjusted time/frequency domain signal.

The timing error filtering unit 203 may be implemented by using a loop filter, a digital oscillator and a subtractor.

During practical application, all the equalization pre-filtering unit 200, the timing error extraction unit 201, the phase adjustment unit 202 and the timing error filtering unit 203 may be implemented through a central processing unit (CPU, Central Processing Unit), a micro processor unit (MPU, Micro Processor Unit), a digital signal processors (DSP, Digital Signal Processor) or a field programmable gate array (FPGA, Field programmable Gate Array) located in the clock recovery device; and all the CPU, the DSP and the FPGA may be built in the clock recovery system.

The present disclosure is illustrated with reference to the flow chart and/or the block diagram of the method, device (system) and computer program product according to the embodiments of the present disclosure. It should be appreciated that each flow in the flow chart and/or each block in the block diagram and/or the combination of the flows in the flow chart and the blocks in the block diagram may be realized by computer program instructions. These computer program instructions may be provided to a general-purpose computer, a special purpose computer, an embedded processor or processors of other programmable data processing devices to generate a machine which makes the instructions executed by the processors of the computers or the processors of other programmable data processing devices generate a device for realizing the functions specified in one or more flows of the flow chart and/or one or more blocks in the block diagram.

These computer program instructions may also be stored in a computer-readable memory which is capable of guiding a computer or another programmable data processing device to work in a given manner, thereby enabling the instructions stored in the computer-readable memory to generate a product including an instruction device for realizing the functions specified in one or more flows of the flow chart and/or one or more blocks in the block diagram.

These computer program instructions may also be loaded to a computer or other programmable data processing devices to execute a series of operations thereon to generate the processing realized by the computer, so that the instructions executed by the computer or other programmable data processing devices offer the steps for realizing the functions specified in one or more flows of the flow chart and/or one or more blocks in the block diagram.

Although preferred embodiments of the present disclosure have been described herein, additional variations and modifications may be made on these embodiments once those skilled in the art know the basic creative concept of the present disclosure. Thus, the accompanying claims are intended to cover the preferred embodiments and all the variations and modifications that fall within the scope of the present disclosure.

Apparently, various modifications and variations can be devised by those skilled in the art without departing from the spirit and scope of the present disclosure. Thus, if these modifications and variations of the present disclosure belong to the scope of the claims of the present disclosure and the equivalents thereof, then the present disclosure is also intended to cover such modifications and variations.

What is claimed is:

1. A clock recovery method, comprising:
   performing a clock equalization pre-filtering on an input time and/or frequency domain signal according to a self-adaptive equalization coefficient inputted currently, to obtain an equalization pre-filtering signal;
   acquiring a phase error of the input time and/or frequency domain signal according to the equalization pre-filtering signal; and
   performing a phase adjustment on the input time and/or frequency domain signal according to the phase error and performing a self-adaptive equalization processing on the phase-adjusted time and/or frequency domain signal to output a new self-adaptive equalization coefficient.

2. The method according to claim 1, wherein the time and/or frequency domain signal comprises a first time and/or frequency domain sub-signal according to first optical polarization and a second time and/or frequency domain sub-signal according to second optical polarization, wherein the frequency domain signal is generated by converting a time domain signal into a frequency domain signal through a time-frequency conversion.

3. The method according to claim 1, wherein the performing the clock equalization pre-filtering on the input frequency domain signal according to the self-adaptive equalization coefficient inputted currently employs the following manner:

$$\begin{cases} X_{pd}(k) = X(k)H_{xx}(k) + Y(k)H_{xy}(k) \\ Y_{pd}(k) = X(k)H_{yx}(k) + Y(k)H_{yy}(k) \end{cases},$$

$$k \in K \cup \left(K + \frac{N}{2}\right), K = \left(\frac{N}{8}, \ldots \frac{3N}{8} - 1\right)$$

wherein, $H_{xx}(k)$, $H_{xy}(k)$, $H_{yx}(k)$ and $H_{yy}(k)$ are frequency domain self-adaptive equalization coefficients, K is a frequency point index for phase discrimination, X(k) is a first frequency domain polarization sub-signal, Y(k) is a second frequency domain polarization sub-signal, and $X_{pd}(k)$ and $Y_{pd}(k)$ are the equalization pre-filtering signals obtained after the clock equalization pre-filtering.

4. The method according to claim 3, wherein the acquiring the phase error of the input frequency domain signal according to the equalization pre-filtering signal employs the following manner:

$$C = \sum_{k=0}^{\frac{N}{2}-1} \left\{ X_{pd}(k) X_{pd}^*\left(k + \frac{N}{2}\right) + Y_{pd}(k) Y_{pd}^*\left(k + \frac{N}{2}\right) \right\}$$

wherein, $X_{pd}(k)$ and $Y_{pd}(k)$ are the equalization pre-filtering signals obtained after the clock equalization pre-filtering; $X^*_{pd}(k)$ and $Y_{pd}^*(k)$ are complex conjugate signals of the equalization pre-filtering signals; and a phase value of C is calculated according to the following formula to obtain the phase error, μ between the input and output frequency domain signals:

$$\mu = -\frac{1}{2\pi} \arg(C)$$

wherein, a value range of the phase error, μ is [0,1).

5. The method according to claim 4, wherein the performing the phase adjustment on the input frequency domain signal according to the phase error comprises:
acquiring a phase adjustment angle η(k) according to the following formula:

$$\eta(k) = \begin{cases} \mu \times \frac{2k}{N}, 0 \le k \le \frac{N}{2} - 1 \\ \mu \times \frac{2(k-N)}{N}, \frac{N}{2} \le k \le N - 1 \end{cases}, k = 0, \ldots, N-1,$$

wherein, μ is the phase error, and the phase adjustment is performed on X(k) and Y(k) according to the phase adjustment angle η(k) by using the following formula:

$$\begin{cases} X_{cr}(k) = X(k)e^{i2\pi\eta(k)} \\ Y_{cr}(k) = Y(k)e^{i2\pi\eta(k)} \end{cases}, k = 0, \ldots, N-1$$

wherein, X(k) is the first frequency domain polarization sub-signal, Y(k) is the second frequency domain polarization sub-signal, and $X_{cr}(k)$ and $Y_{cr}(k)$ are frequency domain signals obtained after the phase adjustment.

6. The method according to claim 4, wherein the performing the phase adjustment on the input time domain signal according to the phase error comprises:
employing the following manner to perform the phase adjustment on the input time domain signal by using a cubic Lagrange interpolation algorithm:

$$z[k] = \sum_{i=-2}^{1} a_i f[k-i]$$

wherein, the coefficients are:

$$\begin{cases} a_{-2} = \dfrac{(u+1)u(u-1)}{6} \\ a_{-1} = \dfrac{(u+1)u(u-2)}{-2} \\ a_0 = \dfrac{(u+1)(u-1)(u-2)}{2} \\ a_1 = \dfrac{(u-1)u(u-2)}{-6} \end{cases}$$

wherein, z[k] is a sample point value obtained by interpolating a sample point f[k] to a k+µ position through a decimal pointer, µ; if every 128 sample points use the same interpolation decimal pointer, µ, then the decimal pointer, µ=mod(2×µ, 1), and µ is the phase error.

7. The method according to claim 1,
wherein the method, after the acquiring the phase error of the input time and/or frequency domain signal according to the equalization pre-filtering signal, further comprises filtering the phase error to obtain a filtered phase error; and
wherein the performing the phase adjustment on the input time and/or frequency domain signal according to the phase error and performing the self-adaptive equalization processing on the phase-adjusted time and/or frequency domain signal to output the new self-adaptive equalization coefficient comprises: performing the phase adjustment on the input time and/or frequency domain signal according to the filtered phase error and performing the self-adaptive equalization processing on the phase-adjusted time and/or frequency domain signal to output the new self-adaptive equalization coefficient.

8. A clock recovery device, comprising: an equalization pre-filtering unit, a timing error extraction unit and a phase adjustment unit connected in sequence, wherein:
the equalization pre-filtering unit is configured to perform a clock equalization pre-filtering on an input time and/or frequency domain signal according to a self-adaptive equalization coefficient inputted currently, and input the obtained equalization pre-filtering signal to the timing error extraction unit;
the timing error extraction unit is configured to acquire a phase error of the input time and/or frequency domain signal according to the equalization pre-filtering signal, and input the obtained phase error to the phase adjustment unit; and
the phase adjustment unit is configured to perform a phase adjustment on the input time and/or frequency domain signal according to the phase error, perform a self-adaptive equalization processing on the phase-adjusted time and/or frequency domain signal to output a new self-adaptive equalization coefficient, and feed the new self-adaptive equalization coefficient back to the equalization pre-filtering unit.

9. The device according to claim 8, wherein the time and/or frequency domain signal comprises a first time and/or frequency domain sub-signal according to first optical polarization and a second time and/or frequency domain sub-signal according to second optical polarization, wherein the frequency domain signal is generated by converting a time domain signal into a frequency domain signal through a time-frequency conversion.

10. The device according to claim 8, further comprising: a timing error filtering unit disposed between the timing error extraction unit and the phase adjustment unit, and configured to filter the phase error, and input the filtered phase error to the phase adjustment unit;
wherein the phase adjustment unit is further configured to perform the phase adjustment on the input time and/or frequency domain signal according to the filtered phase error, perform a self-adaptive equalization processing on the phase-adjusted time and/or frequency domain signal, and output a new self-adaptive equalization coefficient.

11. The device according to claim 10, wherein the timing error filtering unit comprises a loop filter, a digital oscillator and a subtractor.

12. The device according to claim 8, wherein the equalization pre-filtering unit comprises a finite impulse response filter of a single polarization system, or a finite impulse response filter of a polarization multiplexing system.

13. A clock recovery system, comprising: the clock recovery device according to claim 8, and a self-adaptive equalizer, wherein:
the clock recovery device inputs the phase-adjusted time and/or frequency domain signal to the self-adaptive equalizer; and
the self-adaptive equalizer outputs the new self-adaptive equalization coefficient according to the phase-adjusted time and/or frequency domain signal, and feeds the new self-adaptive equalization coefficient back to an input end of the clock recovery device.

14. A non-transitory computer-readable storage medium storing instructions which, when executed by a processor, cause the processor to perform a clock recovery method comprising:
performing a clock equalization pre-filtering on an input time and/or frequency domain signal according to a self-adaptive equalization coefficient inputted currently, to obtain an equalization pre-filtering signal;
acquiring a phase error of the input time and/or frequency domain signal according to the equalization pre-filtering signal; and
performing a phase adjustment on the input time and/or frequency domain signal according to the phase error and performing a self-adaptive equalization processing on the phase-adjusted time and/or frequency domain signal to output a new self-adaptive equalization coefficient.

15. The method according to claim 2,
wherein the method, after acquiring the phase error of the input time and/or frequency domain signal according to the equalization pre-filtering signal, further comprises: filtering the phase error to obtain a filtered phase error; and
wherein the performing the phase adjustment on the input time and/or frequency domain signal according to the phase error and performing the self-adaptive equalization processing on the phase-adjusted time and/or frequency domain signal to output the new self-adaptive equalization coefficient comprises: performing the phase adjustment on the input time and/or frequency domain signal according to the filtered phase error and performing the self-adaptive equalization processing on the phase-adjusted time and/or frequency domain signal to output the new self-adaptive equalization coefficient.

16. The method according to claim 3,
wherein the method, after acquiring the phase error of the input time and/or frequency domain signal according to the equalization pre-filtering signal, further comprises: filtering the phase error to obtain a filtered phase error; and wherein the performing the phase adjustment on the input time and/or frequency domain signal according to the phase error and performing the self-adaptive equalization processing on the phase-adjusted time and/or frequency domain signal to output the new self-adaptive equalization coefficient comprises: performing the phase adjustment on the input time and/or frequency domain signal according to the filtered phase error and performing the self-adaptive equalization processing on the phase-adjusted time and/or frequency domain signal to output the new self-adaptive equalization coefficient.

17. The method according to claim 4, wherein the method, after acquiring the phase error of the input time and/or frequency domain signal according to the equalization pre-filtering signal, further comprises: filtering the phase error to obtain a filtered phase error; and wherein the performing the phase adjustment on the input time and/or frequency domain signal according to the phase error and performing the self-adaptive equalization processing on the phase-adjusted time and/or frequency domain signal to output the new self-adaptive equalization coefficient comprises: performing the phase adjustment on the input time and/or frequency domain signal according to the filtered phase error and performing the self-adaptive equalization processing on the phase-adjusted time and/or frequency domain signal to output the new self-adaptive equalization coefficient.

18. The method according to claim 5, wherein the method, after acquiring the phase error of the input time and/or frequency domain signal according to the equalization pre-filtering signal, further comprises: filtering the phase error to obtain a filtered phase error; and wherein the performing the phase adjustment on the input time and/or frequency domain signal according to the phase error and performing the self-adaptive equalization processing on the phase-adjusted time and/or frequency domain signal to output the new self-adaptive equalization coefficient comprises: performing the phase adjustment on the input time and/or frequency domain signal according to the filtered phase error and performing the self-adaptive equalization processing on the phase-adjusted time and/or frequency domain signal to output the new self-adaptive equalization coefficient.

19. The method according to claim 6, wherein the method, after acquiring the phase error of the input time and/or frequency domain signal according to the equalization pre-filtering signal, further comprises: filtering the phase error to obtain a filtered phase error; and wherein the performing the phase adjustment on the input time and/or frequency domain signal according to the phase error and performing the self-adaptive equalization processing on the phase-adjusted time and/or frequency domain signal to output the new self-adaptive equalization coefficient comprises: performing the phase adjustment on the input time and/or frequency domain signal according to the filtered phase error and performing the self-adaptive equalization processing on the phase-adjusted time and/or frequency domain signal to output the new self-adaptive equalization coefficient.

20. The device according to claim 9, further comprising:

a timing error filtering unit disposed between the timing error extraction unit and the phase adjustment unit, and configured to filter the phase error, and input the filtered phase error to the phase adjustment unit;

wherein the phase adjustment unit is further configured to perform the phase adjustment on the input time and/or frequency domain signal according to the filtered phase error, perform a self-adaptive equalization processing on the phase-adjusted time and/or frequency domain signal, and output a new self-adaptive equalization coefficient.

* * * * *